US008336105B2

(12) United States Patent
Hartung et al.

(10) Patent No.: US 8,336,105 B2
(45) Date of Patent: Dec. 18, 2012

(54) METHOD AND DEVICES FOR THE CONTROL OF THE USAGE OF CONTENT

(75) Inventors: Frank Hartung, Herzogenrath (DE); Silke Holtmanns, Klaukkala (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1248 days.

(21) Appl. No.: 10/595,566

(22) PCT Filed: Oct. 31, 2003

(86) PCT No.: PCT/EP03/12141
§ 371 (c)(1),
(2), (4) Date: Dec. 11, 2006

(87) PCT Pub. No.: WO2005/050415
PCT Pub. Date: Jun. 2, 2005

(65) Prior Publication Data
US 2007/0079381 A1    Apr. 5, 2007

(51) Int. Cl.
*H04L 29/06* (2006.01)
(52) U.S. Cl. ............... 726/27; 726/26; 726/30; 726/31; 726/32; 726/33; 713/194
(58) Field of Classification Search .................. 713/194; 726/26, 27, 30, 31, 32, 33
See application file for complete search history.

(56) References Cited

U.S. PATENT DOCUMENTS

| | | | |
|---|---|---|---|
| 5,917,912 A | | 6/1999 | Ginter et al. |
| 6,378,068 B1 * | | 4/2002 | Foster et al. ................... 713/1 |
| 6,772,340 B1 * | | 8/2004 | Peinado et al. ............... 713/168 |
| 7,206,765 B2 * | | 4/2007 | Gilliam et al. ................... 705/51 |
| 7,590,863 B2 * | | 9/2009 | Lambert ........................ 713/189 |
| 7,617,158 B2 * | | 11/2009 | Bjorkengren et al. ........... 705/51 |
| 2002/0035697 A1 * | | 3/2002 | McCurdy et al. ............. 713/200 |
| 2002/0091642 A1 * | | 7/2002 | Rahnasto ........................ 705/52 |
| 2003/0004885 A1 * | | 1/2003 | Banerjee et al. ................ 705/52 |
| 2003/0005135 A1 * | | 1/2003 | Inoue et al. .................... 709/229 |
| 2003/0051149 A1 | | 3/2003 | Robert |
| 2003/0118182 A1 | | 6/2003 | Elomaa et al. |
| 2004/0205028 A1 * | | 10/2004 | Verosub et al. ................. 705/59 |
| 2004/0210771 A1 * | | 10/2004 | Wood et al. .................... 713/201 |
| 2006/0242713 A1 * | | 10/2006 | Ruzyski et al. ................. 726/26 |
| 2007/0067836 A1 * | | 3/2007 | Busboom et al. ............... 726/10 |
| 2007/0271184 A1 * | | 11/2007 | Niebert et al. .................. 705/51 |
| 2011/0265185 A1 * | | 10/2011 | Lewis et al. .................... 726/26 |
| 2011/0289594 A1 * | | 11/2011 | Shibata et al. .................. 726/26 |

FOREIGN PATENT DOCUMENTS

EP        1 120 715 A       8/2001

(Continued)

*Primary Examiner* — Nathan Flynn
*Assistant Examiner* — Sarah Su

(57) ABSTRACT

A method and devices for a control of usage of content is disclosed. In one embodiment, a user device performs the steps of obtaining the content, defining usage rights, generating integrity protection information for defined usage rights, encrypting the content with a content encryption key, encrypting the content encryption key with a key encryption key associated with a recipient device and/or an operator of the recipient device, communicating the encrypted content, the defined usage rights, the encrypted content encryption key, and the integrity protection information to the recipient device. The recipient device performs the steps of verifying the integrity of the defined usage rights based on the integrity protection information, decrypting the encrypted content encryption key with a decryption key corresponding to the key encryption key, decrypting the encrypted content with the content encryption key in a secure environment, applying the defined usage rights to the content in the secure environment, and using the content according to the applied usage rights.

19 Claims, 5 Drawing Sheets

FOREIGN PATENT DOCUMENTS

| | | |
|---|---|---|
| EP | 1120715 | 8/2001 |
| EP | 1 267 247 A | 12/2002 |
| EP | 1267247 | 12/2002 |
| WO | WO 00/08909 A | 2/2000 |
| WO | WO 0008909 | 2/2000 |
| WO | WO 00/20950 A1 * | 4/2000 |
| WO | WO 00/58962 A | 10/2000 |
| WO | WO 0058962 | 10/2000 |

* cited by examiner

METHOD AND DEVICES FOR THE CONTROL OF THE USAGE OF CONTENT

FIELD OF THE INVENTION

The present invention relates to security issues, especially to a method and devices for a control of a usage of content.

BACKGROUND OF THE INVENTION

User devices like personal computers, laptop computers, or mobile phones are more and more developing from a very specialized area of pure computing or pure telephony to devices that provide a multitude of services. Especially for mobile phones, this trend has accelerated and versions of modern mobile phones are already available that offer beside telephony services additionally data services like Multimedia Messaging Services (MMS), MP3 music playback, video streaming, mobile gaming and the like. Furthermore, with the introduction of integrated or attachable cameras, such user devices are no longer restricted to the usage of received data but can also generate data of their own like taking a photo or recording a video and/or audio sequence.

With the possibility to use generated and/or received content on a user device, there is a need to control the usage of the content. The Open Mobile Alliance (OMA) is a standardization instance that partly addresses this need, see OMA Download Architecture Version 1.0 Version 10 Jun. 2002, OMA Digital Rights Management Version 1.0 Version 5 Sep. 2002, and OMA Rights Expression Language Version 1.0 Version 13 Sep. 2002.

The OMA architecture consists of two basic-functionalities, i.e. firstly "Download" specifying how to download content in form of media objects from a download server in a network to a download agent included in the user device. Secondly, it addresses "Digital Rights Management" (DRM), i.e. mechanisms to control the usage of the content on the user device. For download of DRM protected content which is in the framework of OMA defined as content wrapped in a DRM container or a DRM message or encrypted by a symmetric content encryption key, a DRM packager providing the DRM protected content to the download server is used. A DRM agent on the user device handles the DRM protected content according to usage rights given in a rights object referencing to the DRM protected content and acts as a usage rights enforcement entity.

A rights object carrying usage rights for instructing the DRM agent on the user device how to use the content can be received by the user device together with the DRM protected content or separately according to "combined delivery" or "separate delivery", respectively.

When DRM protected content and its associated rights object are received separately from a server at a user device, the user device can have the possibility to forward the DRM protected content according to a process called "superdistribution" to a recipient device. The rights object, however, cannot be forwarded with the DRM protected content to the recipient device but must be loaded to the recipient device from the same server acting as rights server.

Superdistribution enables a user device to forward downloaded DRM protected content to a recipient device. However, it does not provide any control by said superdistributing user device and/or by it's user about the rights object for the superdistributed DRM protected content. Furthermore, OMA-DRM vers. 1.0 based solutions are generally not applicable to content generated at a user device.

Microsoft® Windows® Server™ 2003 White Paper—Technical Overview of Microsoft Windows Rights Management in the Enterprise, Microsoft Corporation, published June 2003 on the Internet, describes a solution for controlling of the usage of content generated by a user at a user device in form of a computer. The user defines usage rights like e.g. permissions to view, copy, print, save, store, forward, and modify the content. The usage rights can also specify conditions such as an expiration time of the usage rights and applications and entities that are excluded from accessing the content. A Rights Management (RM)-enabled application on the user device encrypts the content with a symmetric key, binds the encrypted content with a publishing license comprising the defined usage rights and sends the encrypted content including the publishing license to a recipient device in form of a further computer with a further RM-application. Before using the content at the recipient device, the recipient device must send the publishing license to a RM server for requesting an issuance of a use license that specifies the usage rights of the further computer with respect to the received content. The publishing license and the use license can be different from each other as the RM server adds conditions to the use license as the expiration of the use license or an application or operating system exclusion. Only after a validation by the RM server that the operator of the recipient device is authorized and after checking the identity of the operator, the use license is created and sent by the RM server to the recipient device, which subsequently decrypts the content and uses the content according to the use license.

However, this solution is problematic as a third entity, i.e. the RM server, is allowed to alter the usage rights specified by the user of the user device. Furthermore, it is not optimal from a privacy point of view as the RM server gains knowledge about the receiver of the content. In addition, the method is rather complicated involving many encryption, decryption, verification and validation steps and message exchanges before allowing the recipient device to use the content.

Thus, both known solutions provide only limited control about the usage of the content at the recipient device. Furthermore, their limitations to either DRM protected or content generated at a user device is very inconvenient, e.g. a user that wants to have an all-in-one solution being applicable for both DRM protected and content generated at the user device cannot be served appropriately.

SUMMARY OF THE INVENTION

Based on the prior art solutions it is an object of the present invention to improve the control about the usage of content.

This object is achieved by a user device, a recipient device, and methods as described in the independent claims. Advantageous embodiments of the user device, the recipient device, and the methods are described in the dependent claims.

A method for a control of usage of content is disclosed. The method comprises of several steps that can be executed step-by-step according to the sequence of mentioning. Alternative sequences are possible and some steps can be executed in parallel or can be combined.

The content is obtained at a user device like a personal computer, a laptop, a mobile phone, or a smart phone or the like. Examples for content are photos or video and audio sequences. The content can be generated at the user device, e.g. by taking a photo with a camera integrated in or attached to the user device, or can be loaded to the device, e.g. from a content server or a network storage, or can be retrieved from a storage unit of the user device. The user device can access the obtained content for the further steps of the method.

One or more usage rights are defined at the user device. A usage right specifies one or more usage restrictions and/or usage permissions of the content at a recipient device, i.e. at the device to which the content is to be distributed to and to be used according to the usage restrictions and usage permissions of the defined usage rights. Furthermore, integrity protection information based on that the integrity of the defined usage rights can be verified is generated at the user device.

The content is encrypted with a content encryption key and the content encryption key is encrypted with a key encryption key associated with the recipient device and/or an operator of the recipient device. The key encryption key can be a symmetric or asymmetric key. The key encryption key can belong to a single recipient device or a group of devices to which the recipient device belongs to. Alternatively or in addition, the key encryption key can be a key belonging to a single person or a group of persons authorized to operate the recipient device. An operator may be entitled to operate the recipient device directly and/or remotely. Examples for a key encryption key are a personal public key of an operator or a device domain public key. The encryption steps are preferably executed at the user device e.g. in order to save messaging effort and for improved privacy and confidentiality, e.g. for private or confidential content. One or both of the encryption steps can be alternatively delegated from the user device to a trusted entity that may be better suited for the encryption, e.g. for performing an encryption that may be not implemented in the user device like a strong or seldomly used or computationally expensive encryption scheme.

The encrypted content, the defined usage rights, the encrypted content encryption key, and the integrity protection information are communicated to the recipient device. Various implementations for the communication steps are possible, e.g. communicating said items via a single message or via separate messages carrying one or more of said items. Furthermore, one or more of said items can be sent directly to the recipient device or via a separate entity like a rights server. The communication of said items can be executed sequentially or in parallel with the same or different communication technologies.

The integrity of the defined usage rights is verified at the recipient device based on the integrity protection information. Based on the verification it can be detected if the usage rights have been altered or not, e.g. if not, the method can continue; if yes, the method can stop and may continue on request. An indication of an integrity infringement can be provided e.g. to an operator of the recipient device which can then decide if the method shall continue or not. An indication may also be given to the user device, e.g. for presenting an integrity infringement to the user of the user device.

The encrypted content encryption key is decrypted at the recipient device. For this reason, a decryption key corresponding to the key encryption key is used. Examples for a decryption key are a private key or a secret symmetric key that correspond to a public key or secret symmetric key, respectively, usable for the encryption of the content encryption key.

The encrypted content is decrypted with the content encryption key in a secure environment of the recipient device. The secure environment can be a hardware security module comprised by the user device and/or a security application operated on the user device, which protects the usage of the content for the user device according to the defined usage rights for that content. A usage of the content that is not in conformity with the defined usage rights is not permitted at the recipient device, e.g. content or parts thereof may not be transferred out of the secure environment if not permitted by a usage right.

The defined usage rights are applied to the content in the secure environment and the content is used at the recipient device according to the applied usage rights.

The method provides a solution that improves the control about the usage of the content. Usage rights can be defined at the user device for any kind of obtainable content for controlling the usage at a recipient device, e.g. based on the preferences of a user of the user device. Furthermore, any manipulation of the defined usage rights on their way from the user device to the recipient device can be detected at the recipient device thus improving the control in a secure manner for the recipient device and the user device and their respective user or operator. An encryption of the content encryption key with a key encryption key associated with the recipient device and/or an operator of the recipient device is of advantage as it prevents a third party being not in possession of the corresponding decryption key to decrypt the content encryption key and thus to access and use the content which is very advantageous especially for controlling the usage of private or confidential content. Further advantages are that the method according to the present invention can be implemented with a lower number of steps compared to known solutions especially for content generated at the user device as less decryption and encryption steps are needed and that an operator of the recipient device can stay anonymous with respect to a rights server.

According to a preferred embodiment, the obtained content is content that is generated at the user device. Content generated at the user device can be very preferable especially from a user perspective as a user can create, distribute and control its own content. Examples for content generated at the user device are a picture or sequence of pictures recorded by a camera integrated in and/or attachable to the user device, text entered into the user device via a keyboard integrated in and/or attachable to the user device, or audio sequences recorded by a microphone integrated in and/or attachable to the user device or combinations thereof. Alternatively or in addition, content can be generated at the user device by loading data from a storage device or storage medium to the user device and modifying the loaded data at the user device, e.g. by using only a part of the loaded data or compiling the loaded data with further obtainable content at the user device.

According to another preferred embodiment, the content is obtained from protected content. Protected content is to be understood as encrypted content for which the usage at the user device is restricted by one or more first usage rights. The first usage rights are thus configured that they permit access to the content at the user device for a processing according to the subsequent steps as far as related to the obtained content. In particular, the protected content can be decrypted in a first secure environment of the user device, e.g. by a first content encryption key, and the first usage rights can be applied to the content in the first secure environment for the obtaining of the content for a subsequent encryption of the obtained content with a content encryption key and the communication of the encrypted content to the recipient device. Obtaining content from protected content can be preferred from a user and content provider perspective, i.e. an entity like a content server from which the user device received the protected content, which e.g. enable a user of the user device to provide a friend's recipient device with the content in a controlled manner.

According to another preferred embodiment, it is verified that the defined usage rights are a subset of the first usage rights, which is advantageous especially for the control of protected content in order to prevent that at the user device usage rights extending the first usage rights are defined, i.e. it is prevented that the recipient device can receive more usage rights from the user device as the user device according to the first usage rights possesses. The verification step is preferably performed in parallel with the definition of the usage rights at the user device to directly prevent extended usage rights definition.

According to another preferred embodiment, the method further comprises the step of restricting the first usage rights in consequence of the definition and/or communication of the defined usage rights to the recipient device. Examples for a restriction are permitting usage of only a part of the content at the user device, to enable certain usage restrictions, to disable certain usage permission, or blocking completely any usage after the usage rights have been defined and/or communicated. This embodiment is very valuable for protected content for e.g. which a content provider does not permit full usage simultaneously on the user device and the recipient device.

According to another preferred embodiment, the defined usage rights comprise a temporal restriction of the usage at the recipient device and the restriction of the one or more first usage rights is abolished after the temporal restriction expires. This embodiment is very preferable because the rights to use the content according to the first usage rights can return automatically, i.e. without the need of further communication, to the user device when the temporal restriction expires.

According to another preferred embodiment, the defined usage rights comprising a temporal restriction can be blocked or deleted at the recipient device before the expiry of the temporal restriction. It can be of advantage to allow for a communication from the recipient device to the user device to indicate the blocking or the deleting of the defined usage rights to the user device. According to a first implementation, the user device can in consequence of the indication of the blocking or the deleting of the defined usage rights abolish the restriction of the first usage rights, preferably immediately after reception of the indication. An advantage is that the user device can use the content according to the first usage rights even before the expiry of the temporal restriction. In case, such an indication is not received at user device, the restriction of the first usage rights can be abolished when the temporal restriction is expired as explained above.

According to another preferred embodiment, the recipient device generates for the aforementioned indication usage rights being a subset of the defined usage rights, in the following called received usage rights, and communicates them as aforementioned indication to the user device. Alternatively to the implementation mentioned before, the received usage rights can be applied until the expiry of the temporal restriction and the abolishing of the restriction in consequence of the indication can then be performed when the temporal restriction expires. This alternative can be of advantage if an abolishment of the restriction of the first usage rights is not permitted and the received usage rights exceed the restricted first usage rights, e.g. when the first usage rights are blocked and the received usage rights comprise e.g. a usage permission for viewing of the content at a display of the user device. Thus, in a time interval ranging from the reception of the received usage rights until the expiry of the temporal restriction usage according to the received usage rights exceeding the restricted first usage rights is possible at the user device, i.e. according to the present example the content can be viewed during the time interval at a display of the user device according to the received usage rights whereas no usage of the content at the user device would be possible according to the blocked first usage rights. In case, the received usage rights do not exceed or equal the restricted first usage rights, the user device may continue to apply the restricted first usage rights for the usage of the content during said time interval. A check may be performed by the user device after the reception of the received usage rights to verify if the received usage rights exceed the restricted first usage rights and based on the result of the check to apply either received usage rights or the restricted first usage rights during the time interval.

According to another preferred embodiment, the defined usage rights can be communicated from the user device to the recipient device via a rights server being acceptable by the recipient device as a rights issuing authority. Examples for a right server are a DRM server or a RM server that can be adapted for the reception, processing, and the transmission of the defined usage rights according to the invention. After reception of the defined usage rights at the rights server, the rights server can associate the defined usage rights with authorization information indicating a rights issuer authorization for the defined usage rights to the recipient device and can communicate the defined usage rights and the authorization information to the recipient device, which can verify the rights issuer authorization based on the received authorization information. This embodiment is very preferable for implementations wherein the recipient device does not accept the user device as rights issuing authority. The user device can make usage of a rights server providing right issuer authorization as explained as a service.

According to another preferred embodiment, the method further comprises the step of communicating to a charging server an indication about the communication of the defined usage rights for a charging of the usage control according to the invention. The charging server can be e.g. operated by a content provider offering protected content distributable from the user device to the recipient device according to the invention. The charging server can be furthermore operated by a mobile operator such that the charging can occur via a mobile telephone bill. Using as charging server a content provider or a mobile operator is of advantage as each of both entities typically has a good charging infrastructure which eases the implementation. Alternatively or in addition, charging may apply when using a service of a rights server for a rights issuer authorization.

According to another preferred embodiment, a user of the user device can define the usage rights. For this reason, the user device can comprise an input unit, which receives at least one instruction from the user for the definition of the usage rights. Preferably, the defined usage rights are presented to the user. As an example, the user device can comprise a keyboard for defining the usage rights and a display showing the defined usage rights as entered by the user. Before completion of the definition, the user may be asked to enter an indication into the user device for confirming the usage rights as presented.

According to another preferred embodiment, the method further comprises the step of defining further usage rights for further recipient devices for controlling the usage of the content at further recipient device. Usage rights for a first of the recipient devices can be identical or different to the usage rights for a second of the recipient devices. Thus, content can be distributed to and controlled at many recipient devices according to the invention which can be especially advantageous for content generated at the user device like electronic postcards or protected content of lower value.

The invention is furthermore embodied in devices, which are described in the following.

A user device for controlling a usage of content at a recipient device is disclosed. The user device comprises at least a transmission unit and a processing unit and typically in addition also a receiving unit for receiving of messages. The processing unit can be adapted to obtain the content, to define at least one usage right specifying one or more usage restrictions and/or one or more usage permissions of the content at the recipient device, to generate integrity protection information for the at least one defined usage right, to encrypt the content with a content encryption key, and to encrypt the content encryption key with a key encryption key associated with the recipient device and/or an operator of the recipient device. The transmission unit can be adapted to send the encrypted content, the at least one defined usage right, the encrypted content encryption key, and the integrity protection information to the recipient device. The user device can be used in any of the embodiments of the method as described.

Furthermore, a recipient device for a controlled usage of content is disclosed. The recipient device comprises at least a receiving unit and processing unit and typically also a transmission unit for sending of messages. The receiving unit can be adapted to receive the content being encrypted by a content encryption key, at least one defined usage right specifying one or more usage restrictions and/or usage permissions of the content, a content encryption key being encrypted by a key encryption key associated with the recipient device and/or an operator of the recipient device, and integrity protection information for the at least one defined usage right. The processing unit can be adapted to verify the integrity of the at least one usage right based on the integrity protection information, to decrypt the encrypted content encryption key with a decryption key corresponding to the key encryption key, to decrypt the encrypted content with the content encryption key in a secure environment, to apply the at least one defined usage right to the content in the secure environment, and to use the content according to the applied at least one defined usage right. The recipient device can be used in any of the embodiments of the method as described.

The present invention also conquers computer programs comprising portions of software codes in order to implement the method as described above when operated by a respective processing unit of a user device and a recipient device. The computer program can be stored on a computer readable medium. The computer-readable medium can be a permanent or rewritable memory within the user device or the recipient device or located externally. The respective computer program can be also transferred to the user device or recipient device for example via a cable or a wireless link as a sequence of signals.

A computer program loadable into a processing unit of a user device is disclosed. The computer program comprises code adapted to execute a process for obtaining of content, to execute a process for defining at least one usage right specifying one or more usage restrictions and/or one or more usage permissions of the content at a recipient device, to execute a process for generating integrity protection information for the at least one defined usage right, to execute a process for encrypting the content with a content encryption key, to execute a process for encrypting the content encryption key with a key encryption key associated with the recipient device and/or an operator of the recipient device, and to initiate a process for a communication of the encrypted content, the at least one defined usage right, the encrypted content encryption key, and the integrity protection information to the recipient device. The computer program loadable into the processing unit of the user device can be used in any of the embodiments of the method as described.

Furthermore, a computer program loadable into a processing unit of a recipient device is disclosed. The computer program comprises code adapted to execute a process for a verification of the integrity of at least one defined usage right based on integrity protection information for the at least one defined usage right, the at least one defined usage right specifying one or more usage restrictions and/or usage permissions for the usage of content, to execute with a decryption key a process for a decryption of an encrypted content encryption key being encrypted by a key encryption key associated with the recipient device and/or an operator of the recipient device, the decryption key corresponding to the key encryption key, to execute in a secure environment with the content encryption key a process for a decryption of the encrypted content being encrypted with the content encryption key, to execute a process for applying the at least one defined usage right to the content in the secure environment and to control a process for using the content according to the applied at least one defined usage right. The computer program loadable into the processing unit of the recipient device can be used in any of the embodiments of the method as described.

In the following, detailed embodiments of the present invention shall be described in order to give the skilled person a full and complete understanding. However, these embodiments are illustrative and not intended to be limiting, as the scope of the invention is defined by the appended claims.

DETAILED DESCRIPTION OF THE INVENTION

Figure 1:
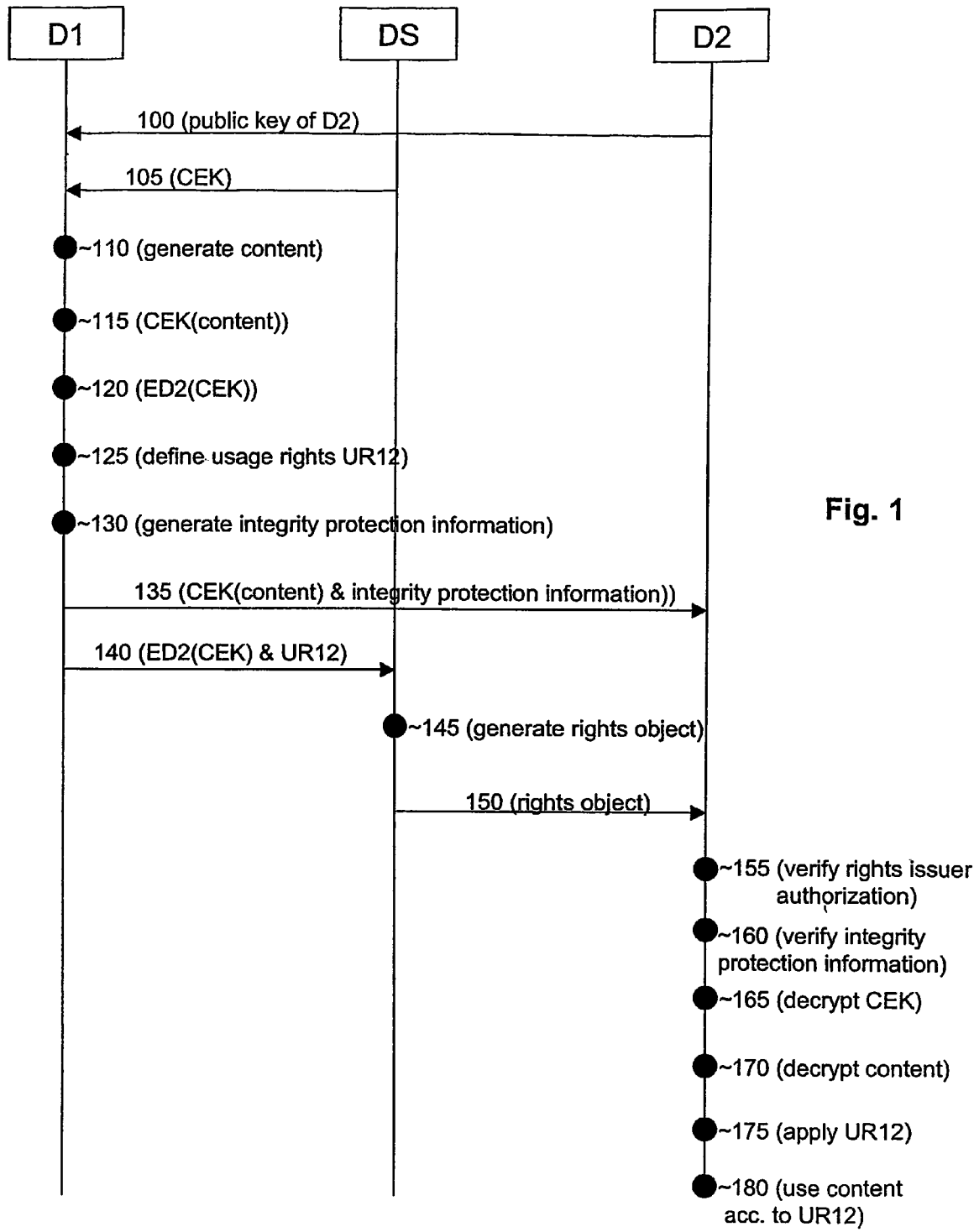
FIG. 1 shows a first embodiment for the control of content usage.

FIG. 1 shows an example of a flow of processes and messages in order to illustrate the controlling of the usage of content. The current example relates to the control of non-protected content like content generated at the user-device D1 although many processes and messages can be applied for the control of protected content for which an example is described in conjunction with FIG. 3.

According to FIG. 1, a public key associated with the recipient device D2 serving as an example for a key encryption key is communicated via message 100 from the recipient device D2 to the user device D1. Alternatives for the key encryption key are possible as explained before. Alternatively to message 100, the public key can be loaded from a Public-Key Infrastructure (PKI) server, which is not shown in FIG. 1, or can be pre-stored at the recipient device D2.

Furthermore, the user device D1 obtains a content encryption key (CEK) by e.g. receiving the content encryption key from a rights server DS via message 105 as depicted in FIG. 1, or from an internal or remotely accessible storage or by generating the content encryption key at the user device D1.

In process 110, content is generated at the user device D1. The content can be created automatically or even-triggered by the user device D1, e.g. in form of a detector or a sensor integrated in or attached to the user device D1 producing video and/or audio data or the like. The content can be also created by a user of the user device, e.g. by typing in text into a keyboard or touch-screen integrated or attachable to the user device, or by taking a photo or recording a video sequence with a build-in or attachable camera or recording an audio sequence with a microphone. The content can be in addition or alternatively loaded to the user device D1, e.g. from a separate user device or a remote storage. Also combinations of the aforementioned generation methods are possible for generating the content for the next steps, e.g. to take a photo, record an audio sequence, enter some text and to combine this data in a single file.

In a next process 115 denoted as CEK(content) in FIG. 1, the generated content is encrypted with a content encryption key. The encryption prevents the access to the content for those entities that are not in the possession of the content encryption key. Furthermore, the content encryption key is encrypted in process 120 with the public key of the recipient device D2 according to the present example for the key encryption key. This encryption process 120 is abbreviated by ED2(CEK) in FIG. 1.

For the usage of the content at the recipient device D2, usage rights specifying usage restrictions and/or usage permissions are defined within process 125. Examples for usage rights are 1. View
2. Play
3. Forward
4. Duplicate
5. Print
6. Copy
7. Modify
8. Synchronize
9. Purpose Binding
10. Temporal Restriction
11. Number of Allowed Usages "View" and "play" assign the right to view respectively play the content at a device, "forward" to forward the content to a further device, "duplicate" to duplicate the content at a device, "print" to print out the content from a device at a printer, "copy" to copy the content at a device, "modify" to modify the content at a device, and "synchronize" to synchronize the content between a device and a further device. "Purpose binding" can be used to restrict the usage of the content according to a specified purpose or specific application, e.g. to allow content to be used for charging but not for other purposes. A "temporal restriction" can be used to restrict a usage time or usage time interval for the content and the number of usages for the content can be restricted by "number of allowed usages".

Typically, definition and processing of usage rights is defined in a positive manner only those usage rights that are defined and communicated to the recipient device D2 can be applied for the usage of the content at the recipient device D2, i.e. if no usage rights are defined and communicated, e.g. for an empty rights object, no rights are assigned to the recipient device D2 and usage of the content is not allowed at all. Depending on the implementation of the invention, usage rights may be defined and processed the opposite way, i.e. to allow all kind of usages if no usage rights are defined and communicated and to define only those usage rights for which no usage at the recipient device D2 is allowed. Thus, implementation of the invention is preferably according to a standardized or de-facto standardized solution and a verification to which kind of standard at least the recipient device D2 complies may be performed before communicating the usage rights to or applying the usage rights at the recipient device D2 in order to ensure that the content is used according to the defined usage rights. Thus, an implementation based on compliant user and recipient devices can be of advantage.

Combinations of usage rights are possible, i.e. a usage right can comprise one or more of the usage rights in the form of usage restrictions and/or usage permissions, e.g. those listed above. Alternatively, or in addition, usage rights can be defined and communicated separately, e.g. each usage right comprising only one usage restriction or usage permission. An example for a combination of usage rights is to allow a 1-month usage with unlimited number of usages without permitting a forwarding or duplication.

Usage rights can have different levels, i.e. a first level may specify the usage rights for the recipient device D2 and a second level may specify the usage rights that the recipient device D2 may assign for the usage of the content at one or more further recipient devices. According to the multi-level concept, an extended control of the content can be achieved: usage rights as defined e.g. in process 125 can contain a first level specifying the usage rights for the usage of the content at the recipient device D2 and a second and optionally further levels specifying the usage rights at one or more further recipient devices. An example is an extended forward lock which permits the recipient device D2 to forward the content to further recipient devices but does not allow a further distribution of the content from the one or more further recipient devices.

The definition of the usage rights according to process 125 can be performed based on user input, i.e. an application residing on the user device D1 may ask the user for input for the definition and based on the user's input the usage rights can be compiled for the content. Alternatively, the usage rights can be pre-defined and be selected by the user of the user device D1 for the definition. Furthermore, the user device D1 may comprise a storage unit wherein pre-defined usage rights are associated with addresses of recipient devices and/or types of content like photo or text. When e.g. a user of the user device D1 selects the recipient device D2 for the distribution of content a certain type, the associated usage rights can automatically be retrieved from the storage unit. The retrieved usage rights can be further used as the defined usage rights or may be modified based on user's input before communicating as defined usage rights to the recipient device D2.

For the definition of the usage rights, a rights expression language (REL) like the Open Digital Rights Language (ODRL), the extensible rights Markup Language (XrML), or an OMA compatible REL can be used. The usage rights can be encoded in extensible Markup Language (XML) and bound to the content they protect, e.g. the defined usage rights can be included in the content or can be linked to the content by a reference identifier comprised in the usage rights and the content or they can be sent to the recipient device D2 together with the encrypted content in a common envelope.

Next, the defined usage rights, also denoted as UR12, are integrity protected starting at process 130. For this reason a cryptographic hash value of the usage rights can be generated at the user device D1 by applying a cryptographic hash function to the defined usage rights. The cryptographic hash value can be signed by a private key associated to the user device D1 and/or of the user of the user device D1. The signed cryptographic hash value can serve as integrity protection information and can be sent with the encrypted content (CEK(content)) in a single message 135 or via separate messages to the recipient device D2, e.g. either directly as shown or via a rights server DS.

According to the present example, the integrity protection information is sent directly to the recipient device D2. The encrypted content encryption key (ED2(CEK)) and the defined usage rights (UR12) can be sent in a single message 140 or in separate messages to a rights server DS. The rights server DS can have an interface at which the defined usage rights and the encrypted content encryption key can be entered from the user device D1. At the rights server DS, the entered defined usage rights and the encrypted content encryption key can be combined to a rights object as indicated by process 145. The rights object can be associated with authorization information for proving that the rights object and thus the usage rights have been authorized by a rights issuing authority, i.e. a authority that is entitled to issue rights for a different entity like the recipient device D2 and that is accepted for issuing rights by this different entity.

The rights object associated with the authorization information can be sent via message 150 from the rights server DS to the recipient device D2. At the recipient device D2, the authorization information as can be verified according to process 155 thus accepting the usage rights to be issued by a rights issuing authority. The verification of the authorization information can be performed by comparing the received authorization information with proven and trusted authorization information stored or obtainable at the recipient device D2.

In the context of the rights issuer authorization, authentication and further security measures like rights server integrity protection or a revocation check for the recipient device D2 can be performed. More detailed examples of the communication between the rights server DS and the recipient device D2 and the respective processing of the exchanged information for authentication, authorization, revocation check, rights object generation and integrity protection are described in conjunction with FIG. 2.

The integrity of the usage rights can be verified in process 160. For this reason, the recipient device D2 can decrypt the signed cryptographic hash value with the corresponding public key of the user device D1 or of it's user resulting in a received cryptographic hash value. Furthermore, the recipient device D2 can apply the same cryptographic hash function as used at the user device D1 to the received defined usage rights resulting in a calculated cryptographic hash value. The recipient device D2 can compare the received cryptographic hash value and the calculated cryptographic hash value. A matching of both cryptographic hash values and by recognizing that the integrity protection information in fact originates from the user device D1 or it's user by verifying the signature of the received cryptographic hash value can be regarded as evidence for the recipient device D2 that the integrity of the defined usage rights is preserved on its way from the user device D1 to the recipient device D2. If the aforementioned conditions are not fulfilled, the method can stop and an indication about integrity infringement can be given to at least one of the recipient device D2, it's operator, the user device D1 and it's user that the defined usage rights have been altered.

Alternative solutions for the integrity protection exist. For example, the user device D1 may generate the cryptographic hash value as explained in conjunction with process 130 but now encrypts the cryptographic hash value with an integrity key being a secret symmetric key sharable between the user device D1 and the recipient device D2. The user device D1 can send the encrypted cryptographic hash value as integrity protection information to the recipient device D2 which can subsequently decrypt the encrypted cryptographic hash value with the integrity key if it is already in possession of the integrity key.

If the recipient device D2 is not in possession of the integrity key, the recipient device D2 may request the integrity key to be communicated from the user device D1 to the recipient device D2 in a protected way, e.g. using a secure transmission via Secure Sockets Layer (SSL) for the communication of the integrity key or encrypting the integrity key by the public key of the recipient device D2 at the user device D1 and communicating the encrypted integrity key to the recipient device D2. Alternatively, the integrity key may be communicated in a protected manner in parallel with the encrypted cryptographic hash value or be obtainable in a secure way from a trusted server.

Integrity protection can be further improved by signing the encrypted integrity protection key or the encrypted cryptographic hash value with a private key of the user device D1 or of it's user.

For verifying the integrity of the defined usage rights, the recipient device D2 can first of all verify the signature in case the encrypted integrity protection key or the encrypted cryptographic hash value are signed with the private key as mentioned before. The signature can be verified by applying the corresponding public key of the user device D1 or it's user to the signed encrypted integrity key or the encrypted cryptographic hash value. Furthermore, the recipient device D2 can decrypt the encrypted integrity key if necessary. Then, the integrity key is used to decrypt the encrypted cryptographic hash value resulting in a received cryptographic hash value. The recipient device D2 can apply the same cryptographic hash function as used at the user device D1 to the received defined usage rights resulting in a calculated cryptographic hash value. Finally comparing the received and the calculated cryptographic hash value provides evidence to the recipient device D2 that the integrity of the defined usage rights is given.

A further technology that can be used in a corresponding manner for integrity protection of the defined usage rights is Message Authentication Code (MAC). An advantage common for all kind of solutions that are based on cryptographic hash values compared to possible solutions wherein the defined usage rights are signed or encrypted in a comparable manner is their relatively low processing effort for encryption and decryption as a file containing the cryptographic hash value is rather small.

According to the present example, the method proceeds after the verification of the integrity of the defined usage rights to process 165, wherein the encrypted content encryption key is decrypted with a decryption key corresponding to the key encryption key. According the current example, a private key associated to the recipient device D2 and/or of it's operator being corresponding to the public key used for encryption of the content encryption key at the user device D1 is used for the decryption in process 165. As mentioned earlier, also a sharable symmetric key can be used for the decryption in process 165 if a symmetric key has been employed for encryption at the user device D1 in process 120.

Furthermore, the encrypted content is decrypted with the content encryption key in process 170. In order to restrict the usage of the content according to the usage rights, the content is within a secure environment of the recipient device D2 to which access to the content is only possible in accordance with the defined usage rights. For this reason, an agent like a DRM agent residing on the recipient device D2 may be used that controls the decryption of the content within said secure environment of the processing and storage equipment of the recipient device D2.

In process 175, the defined usage rights are applied to the content in the secure environment and used at the recipient device D2 according to the usage rights as indicated by process 180. In accordance with the applied usage rights, the content or parts thereof can be transferred for the usage from the secure environment to further secure or unsecure processing or output units of the recipient device D2 or further recipient devices.

Preferably, all steps executed at the recipient device D2 are executed by or under supervision of an agent like the aforementioned DRM agent residing on the recipient device D2. Starting for example from the reception of the protected content by message 135, the DRM agent may recognize that the usage rights and the content encryption key for that particular content are missing and may turn to the rights server DS to request for a rights objects for that particular content. For this reason, the message 135 may contain or, more generally, the encrypted content may be associated with an Uniform Resource Locator (URL) or any other kind of identifier pointing to the rights server DS and to the particular rights object. The DRM agent may instruct the recipient device D2 to perform authentication, authorization, verification of integrity protection information, and decryption processes, to apply the usage rights and to use the content according to the usage rights as explained.

Figure 2:
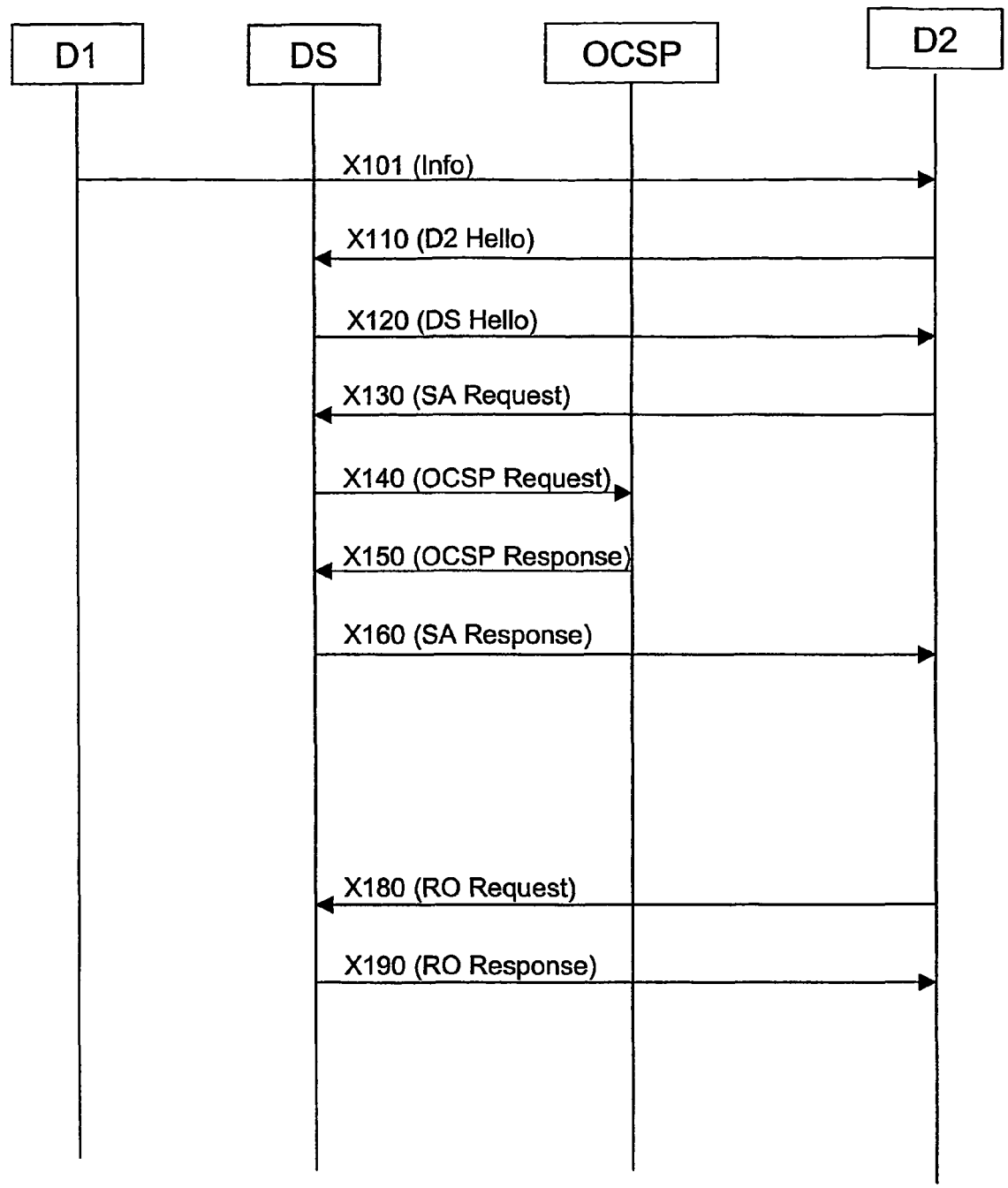
FIG. 2 shows a flow of messages between the recipient device and the rights server involving a revocation check by an OSCP server.

Referring now to FIG. 2 an example for the communication between the rights server DS and the recipient device D2 is given. The example represents a pull solution wherein the recipient device D2 requests from the rights server firstly a security association with the rights server and secondly a rights object comprising the defined usage rights and the encrypted content encryption key for the encrypted content as received from the user device D1. Information indicating to the recipient device D2 to which right server DS to turn to may be provided to the recipient device D2 via message X101, e.g. by sending an SMS. This information can be alternatively communicated to the recipient device D2 in conjunction with the sending of the encrypted content or the integrity protection information, e.g. via message 135 according to FIG. 1 which can be preferable as no additional message X101 has to be sent. The information about the rights server DS may be also preconfigured at the recipient device D2, e.g. when receiving encrypted content from a certain user device D1, the recipient device D1 can automatically turn to the rights server DS related by the pre-configuration to the certain user device D1. An example for a pre-configuration is a table comprising identities of user devices related to one or more addresses of rights servers. In case of pre-configuration at the recipient device D2, no separate communication of information indicating to the recipient device D2 to which rights server DS to turn to may be required. Typically, a rights server DS issues rights objects for many recipient devices and it is useful to associate the defined usage rights respectively the rights object comprising the defined usage rights with an identifier such that the defined usage rights respectively the rights object is identifiable and relatable to the encrypted content. In the following this identifier is called rights object identifier, which can be identical for e.g. the recipient device D2 and the rights server DS. Possible are also implementations wherein different but relatable rights object identifiers are used at the individual devices for identification and relation purpose. A rights object identifier can be communicated directly from the user device D1 to the recipient device D2 e.g. via message 135 (e.g. in the encrypted content) or message X101 and to the rights server DS via message 140.

For a security association between the rights server DS and the recipient device D2, messages X110-X160 can be communicated as explained in the following. In a first message X110 denoted D2 Hello, an identification parameter for identifying the recipient device D2 towards the rights server DS can be sent. In addition, version numbers of soft- and/or hardware associated to the secure environment and supported security algorithms can be sent via message X110 together with optional further information like a list of rights issuing authorities trusted by the recipient device D2 or extensions.

The rights server DS can respond after verifying contents of the message X110 by message X120 denoted by DS Hello. Message X120 can comprise an identity identifying the rights server DS towards the recipient device D2 as well as supported version numbers, supported security algorithms, a rights issuer nonce, status information, and a session identity as well as further information like the list of trusted authorities or extensions. Although described as single messages, messages X110, X120 can consist also of several messages.

The recipient device D2 can respond to message X120 by message X130 denoted as SA (Security Association) request comprising the identities identifying the recipient device D2 and the rights server D2, a time at which the SA request is made, a recipient device nonce, the session identity as well as optionally status information, a certificate chain or extensions. A signature associated with the recipient device D2 and/or an operator of the recipient device D2 can be used to sign a cryptographic hash value created at the recipient device D2 on messages X110-X130 or parts thereof. The signed cryptographic hash value can be included in or attached to message X130.

The rights server DS can perform a revocation check in order to figure out if the recipient device D2 identification information is still valid or if the recipient device D2 has been revoked and is no longer entitled to use content. For the revocation check, the rights server DS or an appropriate server like a Online Certificate Status Protocol server OCSP accessible for this purpose can verify that the identity of the recipient device D2 as obtainable from messages X110 and/or message X130 is still valid and therefore entitled to use content. For the revocation check, the rights server DS respectively the Online Certificate Status Protocol server OCSP can administer information indicating the validity or non-validity of identities of recipient devices. If the identity of the recipient device is found to be non-valid, the rights server DS can stop the method by e.g. not providing the usage rights respectively the rights object to the recipient device D2. An indication about a result of the revocation check may be communicated to the user device D1 and/or the recipient device D2.

According to FIG. 2, the rights server DS turns via message X140 denoted as OCSP request to an Online Certificate Status Protocol server OSCP. Message X140 comprises at least the identity of the recipient device D2 as e.g. obtained by message X110 and/or message X130. The Online Certificate Status Protocol server OSCP can verify if the received identity matches to its administered information and can respond the result to the recipient server DS via message X150 denoted as OCSP response which can furthermore include time information.

If message X150 indicates that the recipient device D2 is not revoked, the rights server D2 can proceed by generating a message XI 60 denoted as SA response comprising the identities of the recipient device D2 and the rights server DS, information about the response by the Online Certificate Status Protocol server OSCP as received by message X150, status information, the session identity, and optionally a certificate chain and extensions. A cryptographic hash value can be created on messages X110, X120, X130 and X140 (or parts thereof) and signed with a digital signature associated with the rights server DS. The signed cryptographic hash value can be included into or attached to the message X160 which is communicated from the rights server DS to the recipient device D2.

The message X160 is processed at the recipient device D2 for authentication of the rights server D2 towards the recipient device D2 based on a verification of the identity of the rights server DS and optionally of the signature associated with the rights server DS. The signed cryptographic hash value can be used to verify that the integrity of the information exchanged in messages X110, X120, X130 and X140 between the rights server DS and the recipient device D2 is preserved. Accordingly, the recipient device D2 can decrypt the signed cryptographic hash value with a public key associated with the rights server DS comprised e.g. in the certificate chain communicated via message X160 to the recipient device D2 and compare the decrypted cryptographic hash value with a cryptographic hash value created by the recipient device on messages X110, X120, X130 and X140 (or parts thereof). Based on the authentication of the recipient server DS towards the recipient device D2, a verification of the protection of integrity of the communication between the rights server DS and the recipient device D2, and a verification of the certificate chain referring optionally to a hierarchically higher rights issuing authority or central authority accepted by the recipient device, the recipient device D2 can verify that the rights server DS is a rights issuing authority accepted by the recipient device D2.

After this verification steps, the recipient device D2 can proceed by requesting the rights object for the encrypted content as received from the originator device D1. For this reason, a rights object identifier identifying the rights object at the rights server DS is included to message X180 denoted as RO request. Further information like the identities of the recipient device D2 and the rights server DS, the time of the RO request, a recipient device nonce, the certificate chain, or extensions can be included to the message X180. The message X180 or preferably a cryptographic hash of the message X180 can be signed and included into or attached to message X180.

At the rights server DS, the information received via message X180 can be analyzed for consistency with the previous service association, e.g. in order to verify that the service association is valid by comparing the session ID as used in the service association with received session ID as received by message X180. A corresponding verification can be made in case the same recipient device nonce is supposed to be used for message X130 and X180. Furthermore, the security association may be valid for a defined time period. The rights server DS can verify if the request time of message X180 matches this time period. If the request time of message 180 does not match the defined time period, the rights server DS may stop the method and inform the recipient device D2 and/or the user device D1 accordingly.

If the security association is valid, the rights server DS can proceed by identifying the defined usage rights based on the rights object identifier associated to the defined usage rights as received from the user device D1 and the rights object identifier as received from the recipient device D2 by message X180. The rights server DS can combine the such identified defined usage rights with the corresponding encrypted content encryption key to the rights object.

The rights server DS can associate the rights object with further information like the identities of recipient device D2 and the rights server DS, a rights object identifier for identifying the rights object and relating the rights object to the encrypted content at the recipient device D2, the recipient device nonce, a time of the response to message X180, further information for the recipient device D2, the OCSP response, the certificate chain, status information, and the session identity and optionally extensions. Furthermore, the rights object and the associated information or a cryptographic hash value of the rights object and the associated information can be signed by a digital signature of the rights server DS. The rights object and the associated information can be comprised by message X190 in signed form or in case of a signed cryptographic hash value, the signed cryptographic hash value and the (unsigned) rights object and the (unsigned) associated information can be comprised by the message X190.

Message X190 is communicated from the rights server DS to the recipient device D2. Based on the associated information or parts thereof like the session identity referencing to the previous security association together with an integrity check based on a verification of the respective signed information comprised in message X190, i.e. the signed rights object with associated information or the signed cryptographic hash value from the rights object and the associated information, giving evidence that the integrity of the contents of message X190 is preserved, the recipient device D2 can verify that the message X190 and thus the defined usage rights are sent from a rights issuing authority accepted by the recipient device D2.

As mentioned before, the flow of messages X180, X190 is a pull mechanism wherein the recipient device D2 initiates the communication of the rights object. Alternatively, a push mechanism can be used wherein message X180 is not needed. In this case, the rights server can generate the rights objects after receiving from the user device D1 the defined usage rights with associated rights object identifier, the encrypted content encryption key and an identifier identifying the recipient device D2 towards the rights server DS based on that the rights server DS knows where to push the rights object by a message corresponding to message X190.

If the recipient server DS receives the aforementioned information from the user device D1 before a security association between the rights server DS and the recipient device D2 is established, the rights server DS can send an information message to the recipient device D2 for requesting the recipient device D2 to initiate the security association as described above, e.g. by requesting the recipient device D2 to send the message X110 to the rights server DS. In said information message, a rights object identifier can be already included and can be used afterwards to request the rights object in a possible pull delivery of the rights object according to messages X180 and X190.

The communication and processing of information of FIGS. 1 and 2 are supposed to be compliant with existing and further OMA DRM standards. However, an implementation of the invention to be compliant with further standards may need an adaptation of the communication and processing of information, e.g. usage rights may not sent as rights object but separately from the encrypted content encryption key. Correspondingly, a security association as described before may be left out or may be less complex.

A less complex solution is to use a digital signature associated with the rights server DS for rights server authorization and rights server integrity protection. The rights server DS can sign a cryptographic hash value of the usage rights with it's digital signature and can send this signed cryptographic hash value as authorization information associated to the defined usage rights to the recipient device. The recipient device D2 knowing the identity of the rights server DS and knowing that the rights server DS is accepted by the recipient device D2 as rights issuing authority can verify the signature with a corresponding decryption key associated with the rights server DS by decrypting the signed cryptographic hash value with said decryption key resulting in a received rights issuer authorization cryptographic hash value. Furthermore, the recipient device D2 can generate a cryptographic hash value with the same cryptographic hash function used for creating the cryptographic hash value that is signed by the rights server DS and compare this self-generated cryptographic hash value with the received rights issuer authorization cryptographic hash value. The matching of both cryptographic hash values together with it's knowledge that the entity represented by the digital signature, i.e. the rights server DS, is accepted as a rights issuing authority can give sufficient evidence for the recipient device D2 to accept the usage rights as being authorized by a rights issuing authority.

Figure 3:
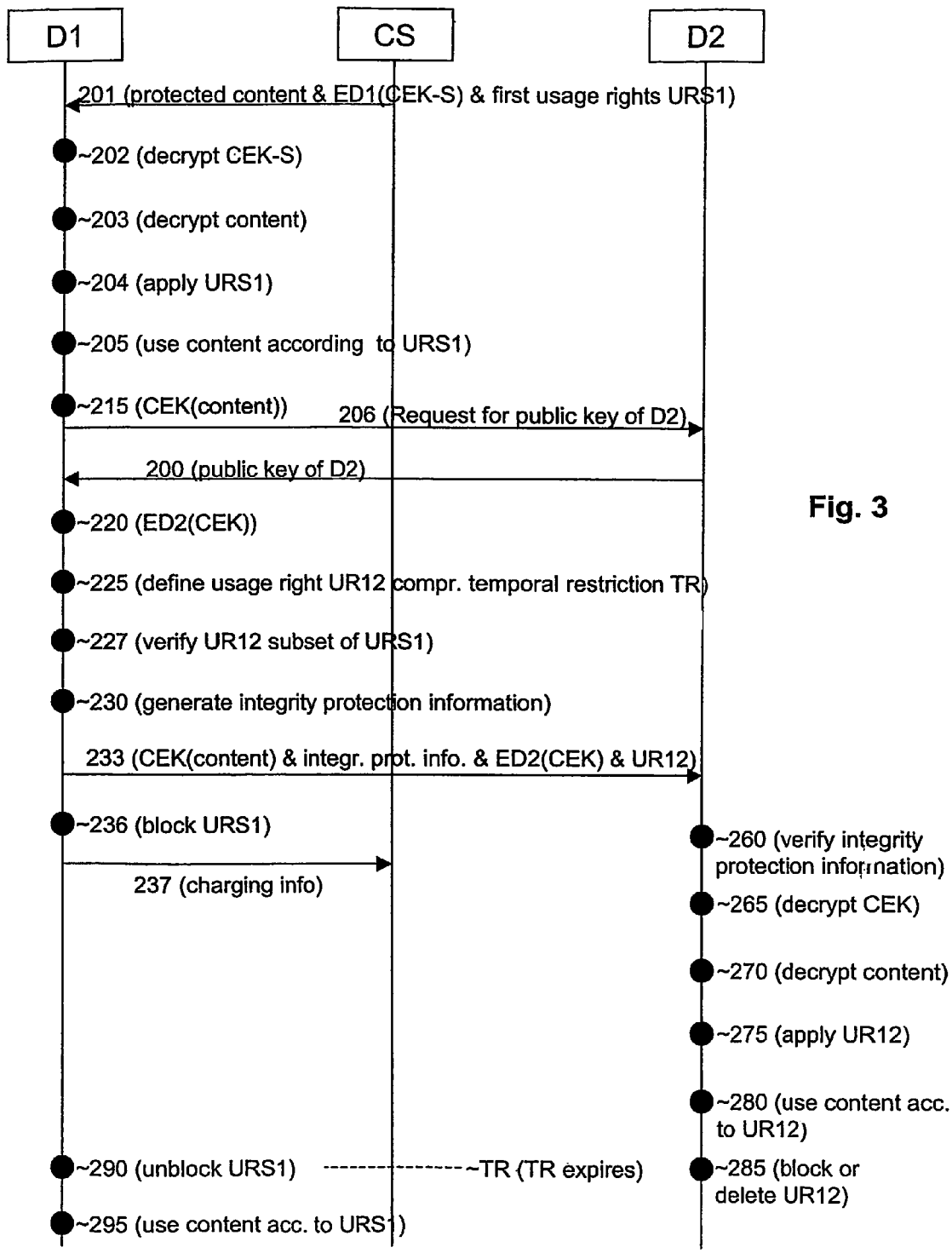
FIG. 3 shows a second embodiment for the control of content usage.

Referring now to FIG. 3, an embodiment for the usage control of DRM protected content is described. In a first step 201, the DRM protected content is received from a content server CS together with a first content encryption key (CEK-S) being encrypted by a public key associated to the user device D1 and/or it's user and first usage rights. This public key serves as a preferred example for a first key encryption key usable for encryption of the first content encryption key. Alternatively, a secret symmetric key sharable by the user device D1 and the content server CS can be used for the encryption of the first content encryption key and the decryption of the encrypted first content encryption key later on.

The encrypted first content encryption key, also denoted as ED1(CEK-S) in FIG. 3, and the first usage rights, also denoted as URS1 in FIG. 3, can be e.g. provided independently or in form of a rights object. According to the present example, the first usage rights specify the permissions and/or restrictions for the usage of the DRM protected content for the user device D1 and allow a usage of the content at the recipient device D2, e.g. according to a multilevel concept as described.

The first usage rights may be integrity protected. In this case, the user device D1 receives integrity protection information based on that it can verify the integrity of the first usage rights. As an example, the integrity protection information can be generated at the content server based on a key associated to the content server CS (instead of a key associated to the user device D1 or of it's user) to be used for signing a cryptographic hash value of the first usage rights as explained in conjunction with FIG. 1. At the user device D1, this integrity protection information can be verified in a corresponding manner based on a corresponding key associated with the content server CS (instead of a key associated to the user device D1 or of it's user) and a corresponding cryptographic hash function used for hashing the first usage rights at the content server CS and the user device D1.

The encrypted first content encryption key is decrypted according to process 202 by applying a corresponding private key of the user device D1 or its user as an example for a decryption key corresponding to the first key encryption key used the for encryption of the first content encryption key.

The first content encryption key is subsequently used according to process 203 for decrypting the encrypted content in a secure environment of the user device D1. For using the content at the user device D1, the first usage rights (URS1) are applied to the content in the secure environment according to process 204 and can then be used accordingly according to process 205.

For providing the content for usage in a controlled manner to the recipient device D2, the user device D1 can proceed e.g. as described in conjunction with FIG. 1 with the additional step of verifying that the defined usage rights for recipient device D2 does not exceed the first usage rights. The verifying step may be executed in parallel with the definition in order to ensure an online verification, i.e. the user can be immediately informed if a defined usage right exceeds the first usage rights and can immediately revise the definition. In case the first content encryption key can be also sent to the recipient device D2 or is alternatively obtainable by the recipient device in a secure manner, the content does not need to be re-encrypted with the same first content encryption key but can be directly sent encrypted with the first content encryption key and further processing at the recipient device D2 as far as related to the decryption of the encrypted content can be based on the first encryption key instead of the content encryption key.

Referring now again to FIG. 3, the processes and messages 200, 206, 215-295 are described in order to illustrate a lending of the DRM protected content from the user device D1 to the recipient device D2.

Before sending the content to the recipient device D2, the content is encrypted with a content encryption key (CEK) according to process 215 that may be regarded as optional in case the first content encryption key can be also provided to or is already available at the recipient device D2. If this is not the case, the user device D1 encrypts the content with the content encryption key (CEK). According to process 220, the content encryption key for the recipient device D2 is encrypted with a public key of the recipient device D2 and/or of it's operator as an example for the key encryption key. This process 220 is abbreviated as ED2(CEK) in FIG. 3. The public key used in process 220 can be requested from the recipient device D2 and sent to the user device D1 as indicated by messages 206 and 200, respectively. Alternatively, the public key may be provided to the user device D1 from a PKI server (not shown). The public key may also be provided to the user device D1 at an earlier phase.

According to process 225, the usage rights for the recipient device D2 are defined. The defined usage rights, abbreviated as UR12 in FIG. 3, are a subset of the first usage rights, abbreviated as URS1 in FIG. 3, which can be verified in process 227. According to the present lending example, the defined usage rights comprise a temporal restriction in form of a time limit TR allowing the usage of the content at the recipient device D2 until the time limit expires. The user device D1 proceeds according to process 230 by generating integrity protection information for protecting the integrity of the defined usage rights and sends the encrypted content (CEK(content)), the integrity protection information, the encrypted content encryption key (ED2(CEK)) and the defined usage rights (UR12) comprising the temporal restriction to the recipient device D2. The sending of these items can be achieved as depicted via a single message 233 or via separate messages directly from the user device D1 to the recipient device D2 or via the content server CS or a further rights server. The encrypted content encryption key and the defined usage rights and optionally the integrity protection information can be combined to a rights object and can be further associated with rights issuer authorization information indicating an entitlement for the rights issuer to issue usage rights. Furthermore, steps for authentication and revocation can be executed as explained in conjunction with FIGS. 1 and 2.

The flow-diagram of FIG. 3 proceeds by step 236 wherein the first usage rights are blocked until the expiry of the time limit as an example for a restriction of the first usage rights and wherein an indication of the sending of the encrypted content and defined usage rights is sent by message 237 as charging information to the content server CS acting as charging server in the current embodiment. Alternatively, the charging server can be separate from the content server CS. Based on the indication received by message 237, the charging server can charge the user device D1 and/or it's user for the lending of the content. If the indication comprises information referring to the recipient device D2 and/or it's operator, alternatively or in addition, the recipient device and/or the operator of the recipient device D2 can be charged in accordance with charging modalities.

The recipient device D2 receiving the encrypted content, the integrity protection information, the encrypted content encryption key and the defined usage rights comprising the temporal restriction proceeds in verifying the integrity protection information according to process 260 which can be performed for example in a corresponding manner as process 160. Furthermore, the recipient device D2 decrypts the content encryption key with the appropriate corresponding private key of the recipient device D2 and/or it's operator according to process 265 which can be executed for example according to process 165. In addition, the recipient device D2 decrypts the content in the secure environment of the recipient device D2 according to process 270 which can be executed in a corresponding manner as process 170. Furthermore, the recipient device D2 applies the defined usage rights according to process 275 which can be performed in a corresponding manner as process 175 and can use the content at the recipient device D2 according to the defined usage rights according to process 280 until time TR. At time TR, the temporal restriction expires and the defined usage rights are blocked or deleted according to process 285 at the recipient device D2, i.e. usage of the content according to the defined usage rights is no longer possible at the recipient device D2 after the time TR.

At the same time TR, the first usage rights are unblocked at the user device D1, i.e. the restriction of the first usage rights is abolished according to process 290. After reestablishing the first usage rights, the content can be used according to process 295 at the user device D1 according to the applied first usage rights.

The lending solution described above is based on a temporal restriction defining in the end the maximum time the content can be used at the recipient device D2 and the maximum time the use of the content at the user device D1 is restricted. However, there might be situations where an earlier transfer of usage rights to the user device D1 is desirable, e.g. if a user of the recipient device D2 uses the content but does not like the content or is not interested to use or keep the content until the temporal restriction expires. In this case, the recipient device D2 can be adapted to itself define usage rights for the user device D1, i.e. the recipient device D2 operates as the user device D1 with the possible exception that the encrypted content is not returned as this the protected content already is available at the user device D1. The usage rights defined at the recipient device D2 are a subset of the usage rights defined at the user device D1. In a preferred solution, the usage rights defined at the recipient device D2 are a copy of the usage rights defined at the user device D1 simplifying the implementation. The usage rights defined at the recipient device D2 can be encrypted with a key associated with the user device D1 and/or of it's user like a public key and integrity protected in a corresponding manner and can be communicated to the user device D1, e.g. directly or via a rights server as described in conjunction with FIG. 1 or 2 for the communication towards the recipient device D2. When communicating the usage rights from the recipient device D2 to the user device D1, the usage rights as previously received from the user device D1 can be restricted at the recipient device D2. Preferably, they are blocked or deleted such that the usage of the content is no longer possible at the recipient device D2.

The user device D1 receiving the usage rights defined at the recipient device D2 can decrypt the usage rights received from the recipient device D2 with it's corresponding decryption key like the private key of the user device D1 or of it's user. The user device D1 can apply these received usage rights to the content until the temporal restriction expires and after that according to the first usage rights. Alternatively, the user device D1 can recognize that the usage rights received from the recipient device D2 are related to the usage rights defined at the user device D1 and thus to the first usage rights and can abolish the restriction of the first usage rights in order to use the content at the user device D1 according to the first usage rights even within the time upon the expiration of the temporal restriction.

The lending of usage rights as described in conjunction with FIG. 3 can be repeated. Furthermore, the user device D1 may lend usage rights to more than one recipient device.

Figure 4:
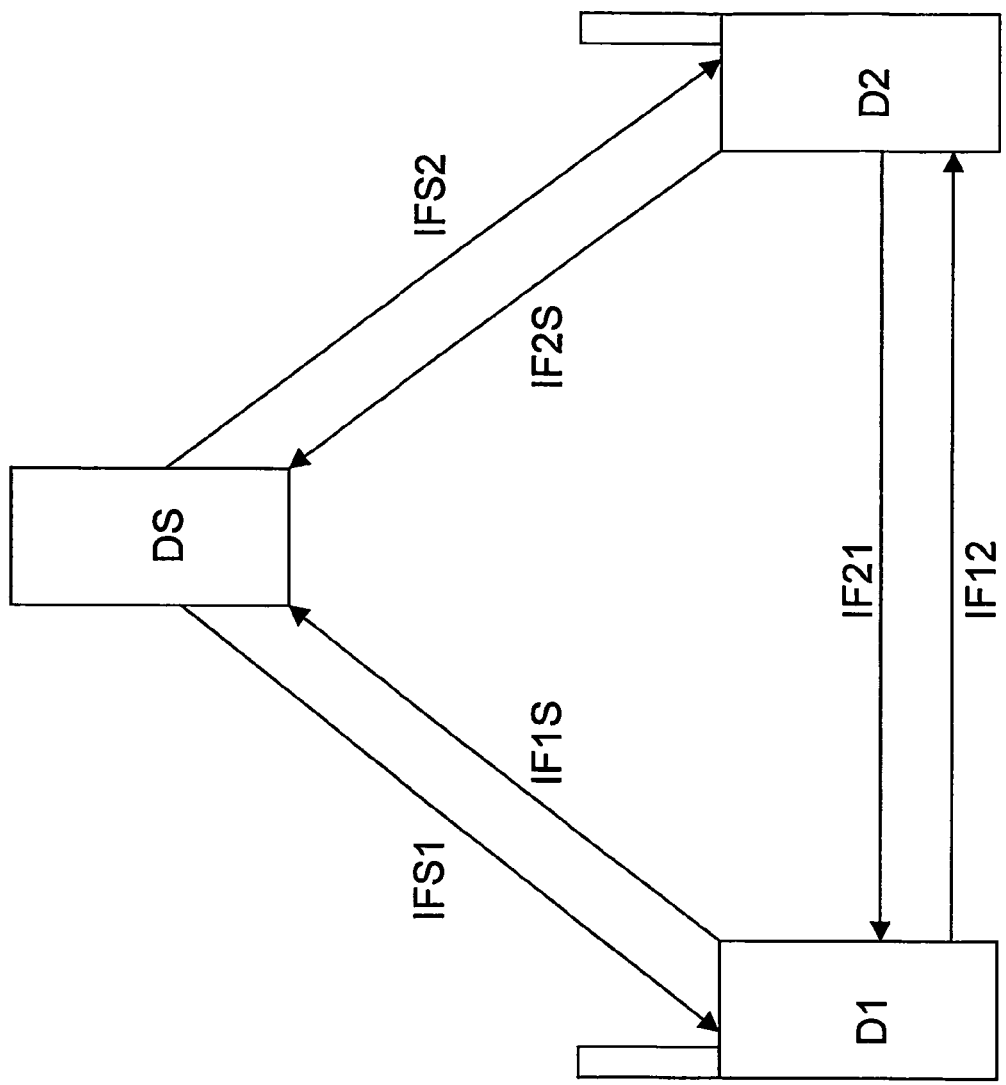
FIG. 4 shows a system according to the invention.

FIG. 4 shows an example for a system for controlling the usage of content according to the invention. The system comprises devices like a user device D1 depicted as a mobile phone, a recipient device D2 depicted as a further mobile phone, and optionally a rights server DS. Possible interfaces IF12, IF21, IF1S, IFS1, IF2S, IFS2 between the individual devices are also depicted.

A user of the user device D1 and a possible operator of the recipient device D2 are not depicted. A user of the user device D1 and an operator of the recipient device D2 can be different or identical persons.

As the content is typically the largest piece of information that is to be communicated, the encrypted content is preferably sent via interface IF12. If the user device D1 and the recipient device D2 are in close vicinity, preferably a low cost wireless technique like Bluetooth or Infrared or wired communication technique like a cable is used for the communication via interface IF12 although further wireless or wired communication techniques and combinations are possible. The same applies for the interface IF21, which can be used for an early return of the usage rights as described above or for an indication for the user device D1 in case an integrity infringement of the defined usage rights is detected at the recipient device D2. Alternatively or in addition, interface IF21 can be also used for communicating authentication information like certificates for authentication the user device D1 to the recipient device D2 or vice versa or both. Interface IF12 can be furthermore used to communicate the integrity protection information for protecting the integrity of the usage rights as defined at the user device D1 and the encrypted content encryption key.

Also the usage rights defined at the user device D1 can be communicated via the interface IF12. In case a rights issuer authorization by a rights server DS is required, the defined usage rights can be communicated to the rights server DS via interface IF1S. Communication between the rights server DS and the recipient device D2 for a rights issuer authorization can be performed via interfaces IFS2 as explained e.g. in conjunction with FIG. 1 and interfaces IFS2 and IF2S as explained in conjunction with FIG. 2.

Figure 5A:
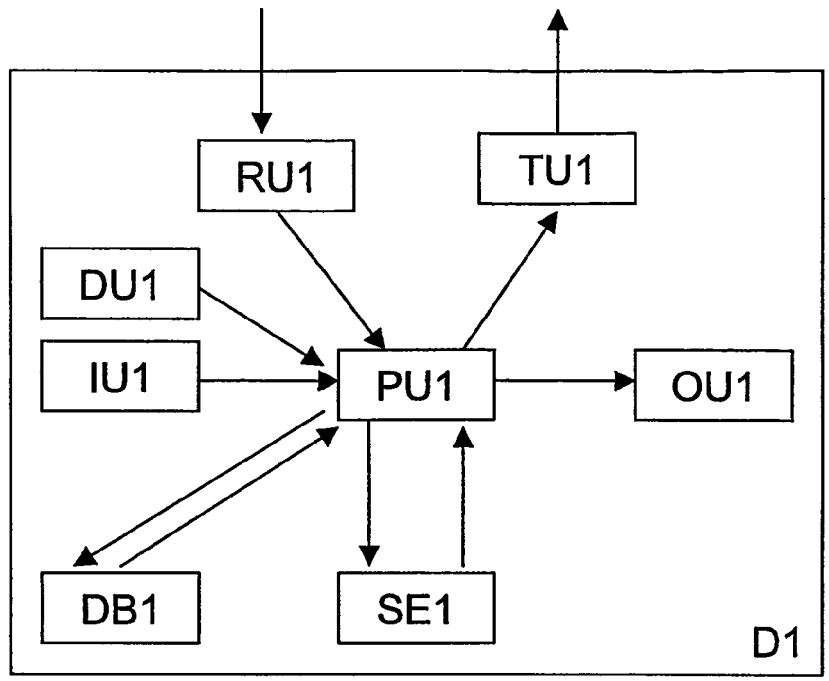
FIG. 5 shows an embodiment for the user device (a) and for the recipient device (b).

For interfaces IFS1, IF1S, IFS2, IF2S wireless communication techniques e.g. according to the Global System for Mobile Communication (GSM), General Packet Radio System (GPRS) or Universal Mobile Telecommunication System (UMTS) can be used in case the user device D1 and the recipient device D2 are wireless devices like mobile phones. Examples for messages according to wireless communication techniques are Short Messaging Service (SMS), Wireless Application Protocol (WAP) Push, and MMS. In case, the user device D1 and the recipient device D2 are stationary devices the interfaces IFS1, IF1S, IFS2, IF2S can be wired like a wired connection via the Internet. Also combinations of communication techniques for the individual interfaces are possible, e.g. the user device D1 may be a laptop computer with Wireless Local Area Network (WLAN) access to an access point which is connectable to the rights server DS in a wired manner thus interface IF1S being represented by a first wireless connection followed by second wired connection. The recipient device D2 can be similar like the user device e.g. a mobile phone, a smart phone, a laptop computer, a personal computer, or can be a stationary or non-stationary server. According to a further example for IF12 or IF21, a media card or any other kind of portable storage medium can be used. For information to be communicated e.g. form of messages from the user device D1 to the recipient device via IF12, the user device D1 may have an integrated or an attachable writing unit that writes the information on the portable storage medium. The portable medium can be inserted in a reading unit integrated or attachable to the recipient device D2. The reading unit is adapted to read the information from the portable storage medium for making the information accessible to the recipient device D2. Correspondingly, communication of information from the recipient device D2 to the user device D1 via interface IF21 can be performed with a writing unit integrated in or attachable to the recipient device D2 and a reading unit integrated in or attachable to the user device D1. Thus, in the context of the present invention, a writing unit can be regarded as an example for a transmission unit and the reading unit as an example for a receiving unit. Referring now to FIG. 5a where an embodiment for the user device D1 is depicted. The user device D1 according to FIG. 5a consists of individual units and interfaces which are described in the following.

User device D1 comprises a receiving unit RU1 and a transmission unit TU1 for receiving and sending messages as described e.g. in conjunction with FIGS. 1-4. In case different transmission technologies are used for communication, the receiving unit RU1 and/or the transmission unit TU1 may split-up into multiple receiving and/or transmission sub-units adapted to the respective communication technology. The receiving unit RU1 and the transmission unit TU1 can be alternatively implemented as a transceiver or multiple sub-transceivers.

Content can be generated at the user device D1 by an input unit IU1 like a keyboard or a camera or a microphone or a detector unit DU1 or a sensor (not shown) or combinations thereof. Content can be loaded into the processing unit PU1 from a storage unit DB1 or received via the receiving unit RU1.

The user device D1 furthermore comprises a processing unit PU1 and preferably a secure environment SE1. The secure environment SE1 can be a hardware security module like a SIM card or can be set-up by a security application like a DRM agent loaded into the processing unit PU1 and operated by the processing unit PU1. The security application may reserve dedicated hardware and software resources of the user device D1 for setting up the secure environment SE1. As an example, the security application may reserve a fraction of the processing unit PU1 and a fraction of the storage unit DB1 for the processes performed within the secure environment SE1.

Protected content be loaded to the user device D1 via the receiving unit RU1 and can be stored at the storage DB1. Alternatively or in addition, protected content can be already pre-installed and stored e.g. during manufacturing of the user device D1 e.g. at the storage DB1. The protected content can be fetched by the processing unit PU1 and can be transferred into the secure environment SE1 for further processing like the decryption with the first content encryption key and the encryption with the content encryption key in accordance with the first usage rights.

Correspondingly, first usage rights associated to said protected content can be received via the receiving unit RU1 and stored at e.g. the storage unit DB1 and can be fetched by the processing unit PU1 to be applied for the usage of the content. Alternatively or in addition, first usage rights may be pre-installed and stored as explained above for pre-installed protected content. Furthermore, different usage rights for different user's and/or different times may exist at the user device that can be in corresponding manner stored and applied to any kind of obtainable content.

Content being not protected by usage rights at the user device D1 like content generated at the user device D1 may be encrypted with the content encryption key internally or externally of the secure environment. However, from an implementation point of view it can be advantageous if all kind of obtainable content is processed within the secure environment SE1.

The encrypted content independently whether it originates from protected content and/or generated content can remain in the secure environment SE1 or can be stored e.g. at the database DB1.

For communicating of protected content encrypted with the content encryption key to the recipient device D2, the first usage rights are checked by the processing unit PU1 for an allowance of this communication. If so, the processing unit PU1 can request via the output unit OU1 the user to define via input unit IU1 usage rights for the encrypted content that is to be sent via the transmission unit TU1 to the recipient device D2. The processing unit PU1 can compile the defined usage rights and can check if the defined usage rights are subset of the first usage rights. If it is so, the processing unit PU1 is entitled to fetch the encrypted content e.g. from the secure environment SE1 or the database DB1 for communication to the recipient device D2 via the transmission unit TU1.

For the communication of content being not protected by first usage rights like content generated at the user device D1, the processing unit PU1 can request via the output unit OU1 the user to define via input unit IU1 usage rights for the encrypted content that is to be sent via the transmission unit TU1 to the recipient device D2. The processing unit PU1 can compile the defined usage rights and fetch the encrypted content e.g. from the secure environment SE1 or the database DB1 for communication to the recipient device D2 via the transmission unit TU1.

The processing unit PU1 can be furthermore adapted to generate integrity protection information for the defined usage rights, to encrypt the content encryption key with a key associated with the recipient device D2 and/or with an operator of the recipient device D2 and to initiate the communication of the encrypted content encryption key, the integrity protection information, and the defined usage rights to the recipient device D2, e.g. directly or via a rights server. The processing unit PU1 can be adapted to perform further steps and processes of the invention as far as related to the user device D1.

Figure 5B:
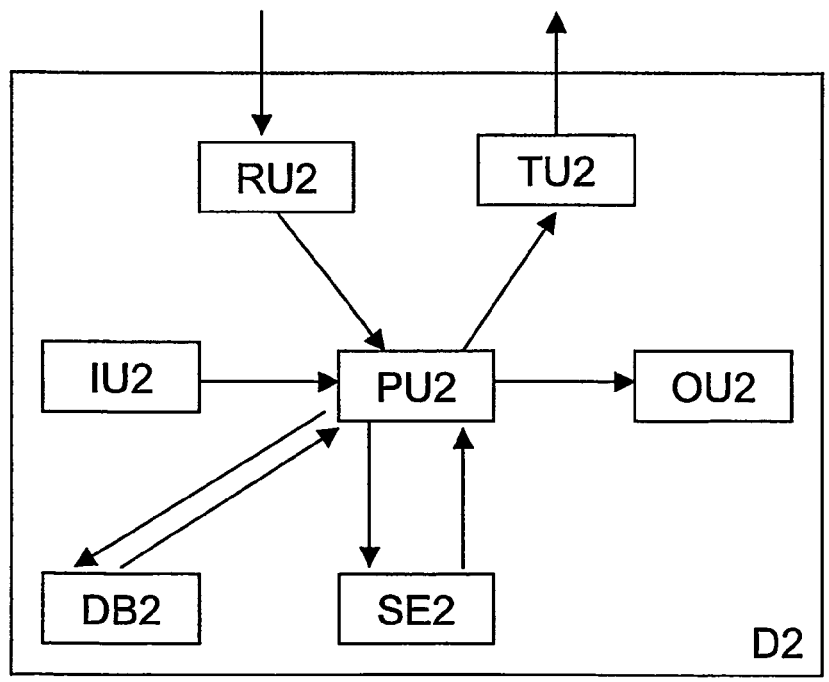

Referring now to FIG. 5b, which depicts an embodiment for a recipient device D2. Corresponding to the user device D1, the recipient device D2 comprises a receiving unit RU2 and a transmission unit TU2 for receiving and sending, respectively, of messages according to the invention. Furthermore, the recipient device D2 comprises a processing unit PU2 and a secure environment SE2 for processing and using encrypted content according to the defined usage rights. The content can be used according to the defined usage rights e.g.

by the processing unit PU2 itself, at an output unit OU2, or for forwarding via a transmission unit TU2. Furthermore, the processing unit PU2 can be adapted to define further usage rights being a subset of the usage rights for the content in the secure environment, e.g. based on an instruction entered via input unit IU2, and to send the further usage rights to the user device D1 via the transmission unit TU2. The processing unit PU2 can be adapted to interface with a storage unit DB2 and to perform further steps and processes of the invention as far as related to the recipient device D2.

The invention claimed is:

1. A method for control of usage of content, the method comprising the steps of:
    receiving, at a user device, protected content from a content provider where the protected content being usage restricted by one or more first usage rights specifying one or more usage restrictions and/or one or more usage permissions of the protected content at the user device;
    obtaining, at the user device, a first content encryption key,
    obtaining, at the user device, the content from the protected content in accordance with the one or more first usage rights by decrypting the protected content by the first content encryption key in a first secure environment of the user device and by accessing the decrypted content in the first secure environment,
    defining, at the user device, at least one usage right, the at least one defined usage right specifying one or more usage restrictions and/or one or more usage permissions of the content at a recipient device and the at least one defined usage right comprising a temporal restriction,
    verifying, at the user device, that the at least one defined usage right is a subset of the one or more first usage rights,
    generating, at the user device, integrity protection information for the at least one defined usage right,
    encrypting, at the user device, the content with a content encryption key,
    obtaining, at the user device, a key encryption key associated with the recipient device and/or an operator of the recipient device,
    encrypting, at the user device, the content encryption key with the key encryption key,
    communicating, from the user device, the encrypted content, the at least one defined usage right, the encrypted content encryption key, and the integrity protection information to the recipient device,
    restricting, at the user device, the one or more first usage rights in consequence of the definition and/or the communication of the at least one defined usage right to the recipient device,
    verifying, at the recipient device, the integrity of the at least one defined usage right based on the integrity protection information,
    decrypting, at the recipient device, the encrypted content encryption key with a decryption key corresponding to the key encryption key,
    decrypting, at the recipient device, the encrypted content with the content encryption key in a secure environment of the recipient device,
    applying, at the recipient device, the at least one defined usage right to the content in the secure environment,
    using, at the recipient device, the content according to the applied at least one usage right,
    generating, at the recipient device, at least one received usage right that is a subset of the at least one defined usage right,
    restricting or blocking or deleting, at the recipient device, the at least one defined usage right before the expiry of the temporal restriction,
    communicating, from the recipient device, an indication of the restricting or blocking or deleting to the user device, the indication comprising the at least one received usage right,
    applying, at the user device, the at least one received usage right after the receipt of the indication from the recipient device until the expiry of the temporal restriction, and
    abolishing, in the user device, the restriction of the one or more first usage rights associated with the first restricting step when the temporal restriction expires.

2. The method according to claim 1, further comprising the steps of
    recognizing by the user device that the at least one received usage right relates to the at least one defined usage right and
    using the content at the user device according to the at least one first usage right even within the time upon the expiration of the temporal restriction.

3. The method according to claim 1, wherein the step of communicating the at least one defined usage right to the recipient device is executed by
    communicating the at least one defined usage right from the user device to a rights server,
    associating by the rights server the at least one defined usage right with authorization information indicating a rights issuer authorization for the at least one defined usage right to the recipient device,
    communicating the at least one defined usage right and the authorization information from the rights server to the recipient device, and the recipient device verifies the rights issuer authorization based on the received authorization information.

4. The method according to claim 1 further comprising the step of communicating to a charging server an indication about the communication of the at least one defined usage right.

5. The method according to claim 1, wherein an input unit of the user device receives at least one instruction from a user for defining the at least one usage right.

6. The method according to claim 1 further comprising the step of defining at least one further usage right for at least one further recipient device for controlling the usage of the content at the at least one further device.

7. A user device for controlling a usage of content at a recipient device, the user device comprising:
    at least a transmission unit and a processing unit and further a receiving unit, wherein the receiving unit being adapted to receive protected content from a content provider, where the protected content is usage restricted by one or more first usage rights specifying one or more usage restrictions and/or one or more usage permissions of the protected content at the user device, and
    the processing unit being adapted to obtain a first content encryption key and obtain the content from the protected content in accordance with the one or more first usage rights by decrypting the protected content with a first content encryption key in a first secure environment of the user device and by accessing the decrypted content in the first secure environment, to define at least one usage right specifying one or more usage restrictions and/or one or more usage permissions of the content at the recipient device, the at least one defined usage right comprising a temporal restriction, to verify that the at least one defined usage right is a subset of the one or more first usage rights, to generate integrity protection information for the at least one defined usage right, to encrypt the content with a content encryption key, to obtain a key encryption key associated with the recipient device and/or an operator of the recipient device, to encrypt the content encryption key with the key encryption key, the transmission unit being adapted to send the encrypted content, the at least one defined usage right, the encrypted content encryption key, and the integrity protection information to the recipient device, and the processing unit being adapted to restrict the one or more first usage rights in consequence of the definition and/or the communication of the at least one defined usage right to the recipient device, the receiving unit is adapted to receive an indication of a restricting or a blocking or a deleting of the at least one defined usage rights from the recipient device before the expiry of the temporal restriction, wherein the indication comprises at least one received usage right that is a subset of the at least one defined usage right, the processing unit is adapted to apply the at least one received usage right after the receipt of the indication from the recipient device until the expiry of the temporal restriction and to abolish the restriction of the one or more first usage rights associated with the definition and/or the communication of the at least one defined usage right to the recipient device when the temporal restriction expires.

8. The user device according to claim 7, the user device being adapted to load the protected content via a receiving unit and to store the protected content at a storage and/or to store pre-installed protected content at the storage.

9. The user device according to claim 7, the user device being adapted to recognize that the at least one received usage right relates to the at least one defined usage right and to use the content according to the at least one first usage right even within the time upon the expiration of the temporal restriction.

10. The user device according to claim 7, wherein the processing unit is adapted to generate an instruction for a rights server to associate the at least one defined usage right with authorization information indicating a rights issuer authorization for the at least one defined usage right to the recipient device and to communicate the at least one defined usage right and the authorization information to the recipient device, and the transmission unit is adapted send the instruction and the at least one defined usage right to the rights server.

11. The user device according to claim 7, wherein the transmission unit is adapted to send to a charging server an indication about the communication of the at least one defined usage right to the recipient device.

12. The user device according to claim 7, the user device further comprising an input unit which is adapted to receive at least one instruction from a user and the processing unit is adapted to define the at least one usage right based on the at least one instruction from the user.

13. The user device according to claim 7, wherein the processing unit is adapted to define at least one further usage right for at least one further recipient device for controlling the usage of the content at the at least one further recipient device.

14. A recipient device for a controlled usage of content, the recipient device comprising at least a receiving unit and processing unit and further a transmission unit, wherein the receiving unit is adapted to receive the content being encrypted by a content encryption key, at least one defined usage right specifying one or more usage restrictions and/or usage permissions of the content and the at least one defined usage right comprising a temporal restriction, a content encryption key being encrypted by a key encryption key associated with the recipient device and/or an operator of the recipient device, and integrity protection information for the at least one defined usage right, the processing unit is adapted to verify the integrity of the at least one usage right based on the integrity protection information, to decrypt the encrypted content encryption key with a decryption key corresponding to the key encryption key, to decrypt the encrypted content with the content encryption key in a secure environment, to apply the at least one defined usage right to the content in the secure environment, and to use the content according to the applied at least one defined usage right, to generate an indication of the restricting or the blocking or the deleting, to generate at least one received usage right that is a subset of the at least one defined usage right for the indication, to restrict or block or delete the at least one defined usage right before the temporal restriction expires, and the transmission unit is adapted to send the indication comprising the at least one received usage right to the user device.

15. The recipient device according to claim 14, wherein the processing unit is adapted to generate an alert if the integrity of the at least one defined usage right is violated and to initiate an indication of the alert at an output unit.

16. The recipient device according to claim 14, wherein the receiving unit is adapted to receive the at least one defined usage right and associated authorization information indicating a rights issuer authorization from a rights server and the processing unit is adapted to verify the rights issuer authorization based on the received authorization information.

17. A method for control of usage of content, the method comprising the steps of:
   receiving, at a user device, protected content from a content provider where the protected content being usage restricted by one or more first usage rights specifying one or more usage restrictions and/or one or more usage permissions of the protected content at the user device;
   obtaining, at the user device, a first content encryption key,
   obtaining, at the user device, the content from the protected content in accordance with the one or more first usage rights by decrypting the protected content by a first content encryption key in a first secure environment of the user device and by accessing the decrypted content in the first secure environment,
   defining, at the user device, at least one usage right, the at least one defined usage right specifying one or more usage restrictions and/or one or more usage permissions of the content at a recipient device and the at least one defined usage right comprising a temporal restriction,
   verifying, at the user device, that the at least one defined usage right is a subset of the one or more first usage rights,
   generating, at the user device, integrity protection information for the at least one defined usage right,
   encrypting, at the user device, the content with a content encryption key,
   obtaining, at the user device, a key encryption key associated with the recipient device and/or an operator of the recipient device,
   encrypting, at the user device, the content encryption key with the key encryption key,
   communicating, from the user device, the encrypted content, the at least one defined usage right, the encrypted content encryption key, and the integrity protection information to the recipient device, restricting, at the content provider, the one or more first usage rights in consequence of the definition and/or the communication of the at least one defined usage right to the recipient device, verifying, at the recipient device, the integrity of the at least one defined usage right based on the integrity protection information, decrypting, at the recipient device, the encrypted content encryption key with a decryption key corresponding to the key encryption key, decrypting, at the recipient device, the encrypted content with the content encryption key in a secure environment of the recipient device, applying, at the recipient device, the at least one defined usage right to the content in the secure environment, using, at the recipient device, the content according to the applied at least one usage right, generating at the recipient device, at least one received usage right that is a subset of the at least one defined usage right, restricting or blocking or deleting, at the recipient device, the at least one defined usage right before the expiry of the temporal restriction, communicating, from the recipient device, an indication of the restricting or blocking or deleting to the user device, the indication comprising the at least one received usage right, without returning the encrypted content to the user device, applying, at the user device, the at least one received usage right at the user device after the receipt of the indication from the recipient device until the expiry of the temporal restriction, and abolishing, in the user device, the restriction of the one or more first usage rights associated with the first restricting step when the temporal restriction expires.

18. A method for control of usage of content, the method comprising the steps of:

receiving, at a user device, protected content from a content provider where the protected content being usage restricted by one or more first usage rights specifying one or more usage restrictions and/or one or more usage permissions of the protected content at the user device;

obtaining, at the user device, a first content encryption key, obtaining, at the user device, the content from the protected content in accordance with the one or more first usage rights by decrypting the protected content by the first content encryption key in a first secure environment of the user device and by accessing the decrypted content in the first secure environment, defining, at the user device, at least one usage right, the at least one defined usage right specifying one or more usage restrictions and/or one or more usage permissions of the content at a recipient device and the at least one defined usage right comprising a temporal restriction, verifying, at the user device, that the at least one defined usage right is a subset of the one or more first usage rights, generating, at the user device, at the user device integrity protection information for the at least one defined usage right, encrypting, at the user device, the content with a content encryption key, obtaining, at the user device, a key encryption key associated with the recipient device, encrypting, at the user device, the content encryption key with the key encryption key associated with the recipient device and/or an operator of the recipient device, communicating, from the user device, the encrypted content, the at least one defined usage right, the encrypted content encryption key, and the integrity protection information to the recipient device, restricting, at the content provider, the one or more first usage rights in consequence of the definition and/or the communication of the at least one defined usage right to the recipient device, verifying, at the recipient device, the integrity of the at least one defined usage right based on the integrity protection information, decrypting, at the recipient device, the encrypted content encryption key with a decryption key corresponding to the key encryption key, decrypting, at the recipient device, the encrypted content with the content encryption key in a secure environment of the recipient device, applying, at the recipient device, the at least one defined usage right to the content in the secure environment, using, at the recipient device, the content according to the applied at least one usage right, restricting or blocking, at the recipient device, the at least one defined usage right before the expiry of the temporal restriction, generating, at the recipient device, at least one received usage right that is a subset of the at least one defined usage right, communicating, from the recipient device, an indication of the restricting or blocking to the user device, the indication comprising the at least one received usage right, applying, at the user device, the at least one received usage right after the receipt of the indication from the recipient device until the expiry of the temporal restriction, and abolishing, in the user device, the restriction of the one or more first usage rights associated with the first restricting step when the temporal restriction expires, wherein the restricting or blocking step, the second generating step, the second communicating step, and the second applying step, and the abolishing step are executed in sequence one after another.

19. A method for control of usage of content, the method comprising the steps of:

receiving, at a user device, protected content from a content provider where the protected content being usage restricted by one or more first usage rights specifying one or more usage restrictions and/or one or more usage permissions of the protected content at the user device;

obtaining, at the user device, a first content encryption key, obtaining, at the user device, the content from the protected content in accordance with the one or more first usage rights by decrypting the protected content by the first content encryption key in a first secure environment of the user device and by accessing the decrypted content in the first secure environment, defining, at the user device, at least one usage right, the at least one defined usage right specifying one or more usage restrictions and/or one or more usage permissions of the content at a recipient device and the at least one defined usage right comprising a temporal restriction, verifying, at the user device, that the at least one defined usage right is a subset of the one or more first usage rights, generating, at the user device, integrity protection information for the at least one defined usage right, encrypting, at the user device, the content with a content encryption key, obtaining, at the user device, a key encryption key associated with the recipient device and/or an operator of the recipient device, encrypting, at the user device, the content encryption key with the key encryption key, communicating, from the user device, the encrypted content, the at least one defined usage right, the encrypted content encryption key, and the integrity protection information to the recipient device, verifying, at the recipient device, the integrity of the at least one defined usage right based on the integrity protection information, decrypting, at the recipient device, the encrypted content encryption key with a decryption key corresponding to the key encryption key, decrypting, at the recipient device, the encrypted content with the content encryption key in a secure environment of the recipient device, applying, at the recipient device, the at least one defined usage right to the content in the secure environment, using, at the recipient device, the content according to the applied at least one usage right, generating, at the recipient device, at least one received usage right that is a subset of the at least one defined usage right, restricting or blocking or deleting, at the recipient device, the at least one defined usage right before the expiry of the temporal restriction, communicating, from the recipient device, an indication of the restricting or blocking or deleting to the user device, the indication comprising the at least one received usage right, checking, at the user device, after reception of the at least one received usage right to verify if the at least one received usage right exceeds the one or more first usage rights;

if the checking step indicates that the at least one received usage right exceeds the one or more first usage rights, then applying the at least one received usage right at the user device after the receipt of the indication from the recipient device until the expiry of the temporal restriction; and if the checking step indicates that the at least one received usage right do not exceed or equal the one or more first usage rights, then applying the one or more first usage rights at the user device after the receipt of the indication from the recipient device until the expiry of the temporal restriction.

* * * * *